United States Patent [19]

Hamada et al.

[11] Patent Number: 4,878,566
[45] Date of Patent: Nov. 7, 1989

[54] METHOD AND MECHANISM FOR SELECTIVELY TRANSMITTING AND INTERRUPTING DELIVERY OF POWER

[75] Inventors: Tetsuro Hamada; Katsuhiko Masuda; Kazunori Shibuya; Kazuhiko Shimada; Etsuo Fujii; Hiroshi Ikegami; Kunitaka Furuya, all of Wako, Japan

[73] Assignee: Honda Giken Kogyo Kabushiki Kaisha, Tokyo, Japan

[21] Appl. No.: 112,676

[22] Filed: Oct. 23, 1987

[30] Foreign Application Priority Data

Oct. 24, 1986 [JP] Japan .................. 61-253465

[51] Int. Cl.$^4$ .............. F16D 11/02; F16D 67/02
[52] U.S. Cl. .................. 192/13 R; 180/244; 192/27; 192/49; 192/102
[58] Field of Search ............... 192/12 R, 17 A, 27, 192/102, 38, 49, 13 R; 180/244

[56] References Cited

U.S. PATENT DOCUMENTS

| 923,857 | 6/1909 | Kettering | 192/27 |
|---|---|---|---|
| 1,980,757 | 11/1934 | Janda | 192/27 |
| 2,391,955 | 1/1946 | Eason | 192/12 R |
| 2,763,351 | 9/1956 | Mueller | 192/17 A |
| 2,989,160 | 6/1961 | Woodruff | 192/38 X |
| 3,087,591 | 4/1963 | Whitney et al. | 192/45 |
| 3,319,749 | 5/1967 | Saeger | 192/27 |
| 3,406,797 | 10/1968 | Toussaint | 192/38 X |
| 3,476,226 | 11/1969 | Massey | 192/38 X |
| 3,958,679 | 5/1976 | Tamarin | 192/38 X |
| 4,605,087 | 8/1986 | Ashauer et al. | 180/244 X |
| 4,735,279 | 4/1988 | Sato | 180/244 |

FOREIGN PATENT DOCUMENTS

| 0207395 | 1/1987 | European Pat. Off. | 192/12 R |
|---|---|---|---|
| 7315306 | 9/1976 | Fed. Rep. of Germany . | |
| 356326 | 9/1931 | United Kingdom . | |
| 695088 | 8/1953 | United Kingdom . | |
| 964494 | 7/1964 | United Kingdom . | |
| 1032605 | 6/1966 | United Kingdom . | |
| 1217512 | 12/1970 | United Kingdom . | |
| 1354083 | 5/1974 | United Kingdom . | |
| 1404759 | 9/1975 | United Kingdom . | |
| 2169972 | 7/1986 | United Kingdom . | |

Primary Examiner—Rodney H. Bonck
Attorney, Agent, or Firm—Roberts, Spiecens & Cohen

[57] ABSTRACT

A method and mechanism for selectively transmitting and interrupting power between an input shaft and an output shaft arranged in coaxial relation in which a rotary member is coupled to one of the shafts to provide first and second states therebetween and wherein in the first state the rotary member is free to rotate and rotation is transmitted between the input and output shafts, whereas in the second state the input shaft can rotate relative to the output shaft and transmission of rotation is interrupted. The rotary member and the one shaft are angularly rotated relative to one another between first and second relative positions in the first and second states, and rotation of the rotary member is halted by a disc brake in the second state.

11 Claims, 6 Drawing Sheets

METHOD AND MECHANISM FOR SELECTIVELY TRANSMITTING AND INTERRUPTING DELIVERY OF POWER

FIELD OF THE INVENTION

This invention relates to a mechanism for selectively transmitting and interrupting the delivery of power between an input shaft and an output shaft and to associated methods.

DESCRIPTION OF THE PRIOR ART

A multiple disc clutch is known which serves as a mechanism for transmitting and interrupting power.

A multiple disc clutch has the disadvantage that in order to increase the frictional contact area, it is necessary to increase its radial size which leads to increase in the size of the clutch.

In addition, the multiple disc clutch cannot apply brake force to the output shaft.

SUMMARY OF THE INVENTION

An object of the present invention is to provide a novel mechanism for selectively transmitting and interrupting power which is capable of overcoming the aforesaid disadvantages in the conventional clutch and controlling power delivery to the output shaft in which the mechanism can be compact in size.

According to the present invention, the mechanism is characterized by the provision of a rotary member equipped with a brake mechanism associated with the input shaft and the output shaft such that a relative angular displacement between the shafts is prevented at the time of free rotation of the rotary member whereas when the rotary member is braked and halted in rotation, a predetermined angular displacement is permitted between the rotary member and the output shaft while the input shaft is free to rotate without delivery of power to the output shaft.

When the input shaft is rotated and the brake mechanism is not operated, the input shaft and the output shaft are connected with each other because the rotary member is allowed to freely rotate. The power from the input shaft therefore can be transmitted to the output shaft. When the brake mechanism is operated and the rotary member is halted, the output shaft is braked in accordance with that of the rotary member. The connection between the input shaft and the output shaft is also disconnected. As a result of this, power is not transmitted to the output shaft although the input shaft continues to rotate.

BRIEF DESCRIPTION OF FIGURES OF THE DRAWINGS

FIGS. 1 to 5 illustrate one embodiment of the present invention in which:

FIG. 1 is a schematic view illustrating a drive system for a four-wheel drive vehicle;

FIG. 2 is a schematic vertical cross sectional side view of a power transmitting mechanism according to the invention;

FIG. 3 is an enlarged cross sectional view taken along line III—III in FIG. 2; and FIGS. 4 and 5 are cross sectional views illustrating the sequential operative states of FIG. 3.

DETAILED DESCRIPTION OF PREFERRED EMBODIMENTS OF THE INVENTION

Figure 1:
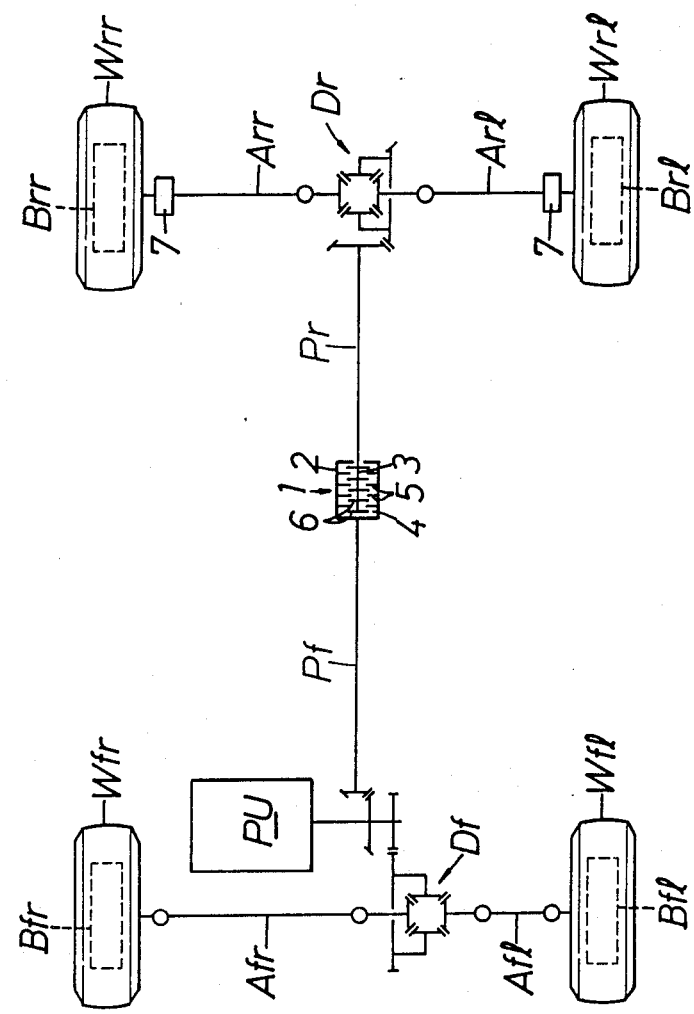

Referring to the accompanying figures of the drawing, therein are shown embodiments in which the mechanism of the present invention is applied to a four-wheel drive vehicle.

FIG. 1, which illustrates one embodiment of the present invention, shows a pair of left and right front wheels Wfl and Wfr equipped with respective brakes Bf and Bfr. The wheels WFl and Wfr are suspended at the front of the vehicle which otherwise is not shown. A pair of left and right rear wheels Wrl and Wrr equipped with respective brakes Brl and Brr are suspended at the rear of the vehicle.

A pair of front wheel axles Afl and Afr are connected to the respective left and right front wheels Wfl and Wfr and are connected to each other through a front differential Df. Rear wheel axles Arl and Arr which serve as a pair of input shafts are respectively connected to the left and right rear wheels Wrl and Wrr through mechanisms 7 for selectively transmitting and interrupting power according to the present invention. The mechanisms 7 for the rear wheels Wrl and Wrr are connected to each other through a rear differential Dr.

A power unit PU including an engine and a transmission is connected to an input portion of the front differential Df. A rear propeller shaft Pr is connected to the input portion of the rear differential Dr. The rear propeller shaft Pr is connected to the front propeller shaft Pf in alignment along a common axis by a viscous clutch 1 so that driving force from the power unit PU can be transmitted from the front propeller shaft Pf to the rear propeller shaft Pr.

The viscous clutch 1 comprises a closed oil chamber 4 which is formed between an outer clutch member 2 and an inner clutch member 3 which can rotate relative to each other. Highly viscous oil and a slight quantity of air which allows the high viscosity oil to undergo heat expansion are enclosed in the closed oil chamber 4. A plurality of outer clutch discs 5 are connected to the outer clutch member 2 by a spline and a plurality of inner clutch discs 6 are connected to the inner clutch member 3 by a spline. The discs 5 and 6 are interengaged one within the other in the closed chamber. Openings (not shown) are provided in discs 5 and 6 respectively for flow of oil therethrough. The outer clutch member 2 is integrally connected to the front propeller shaft Pf and the inner clutch member 3 is integrally connected to the rear propeller shaft Pr.

When the outer clutch member 2 and the inner clutch member 3 rotate relative to each other, clutch discs 5 and 6 rotate relative to each other and apply shear forces to the highly viscous oil. As a result of this, torque is viscously transmitted between the clutch discs 5 and 6. When the relative rotational speed increases, a complex temperature gradient is generated between the clutch discs 5 and 6 due to temperature increase of the oil. An additive effect obtained by combining distortion caused by the complex temperature gradient and increase in pressure in the closed oil chamber 4 generates a frictionaly engagement between the adjacent clutch discs 5 and 6. As a result, torque is frictionally transmitted between the outer clutch member 2 and the inner clutch member 3.

By virtue of the viscous clutch 1, the front propeller shaft Pf and the rear propeller shaft Pr, and thereby the front wheel axles Afl and Afr and the rear wheel axles Arl and Arr are always connected together in a substantially rigid manner.

Since the front wheel axles Afl and Afr and the rear wheel axles Arl and Arr are substantially rigidly connected, the rear wheels Wrl and Wrr will be brought into an overbraked state when the front wheels Wfl and Wfr are overbraked.

Therefore, the power transmitting and interrupting mechanisms 7, according to the present invention, are interposed between the rear wheel axles Arl and Arr and the rear wheels Wrl and Wrr.

Figure 2:
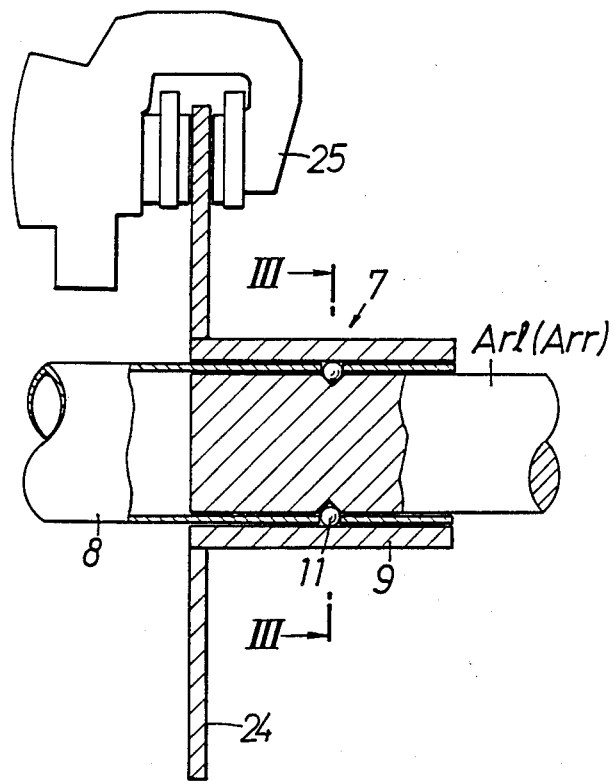
Figure 3:
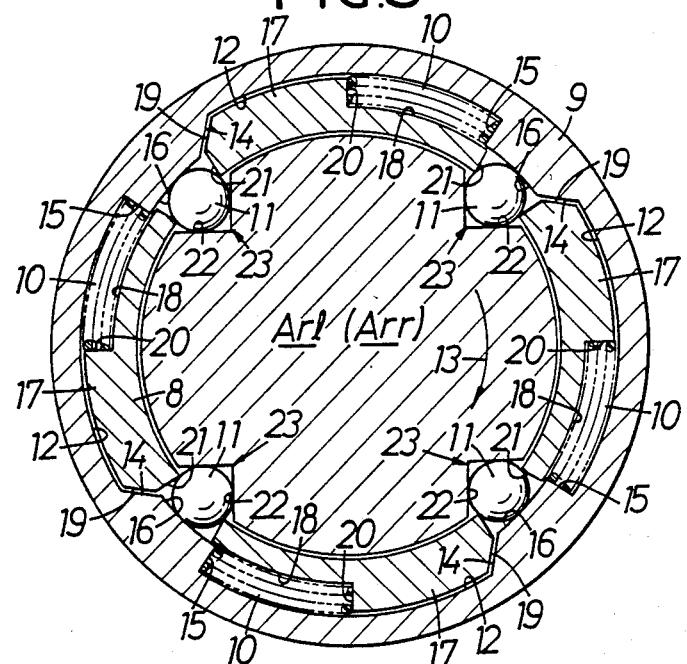

The power transmitting and interrupting mechanism 7, as shown in FIGS. 2 and 3, is incorporated between wheel axle Arl or Arr which serves as an input shaft and an output shaft 8 which is connected to the rear wheel Wrl or Wrr, the mechanism 7 comprising a cylindrical rotary member 9, a plurality of springs 10, for example, four in number which are interposed between the output shaft 8 and the rotary member 9, a plurality of steel balls 11, for example, four in number which serve as rotary bodies forming releasing means and a disc brake mechanism 25 for braking the rotary member 9.

The output shaft 8 is formed as a cylindrical sleeve and rear wheel axles Arl and Arr are repsectively relatively rotatably inserted into the cylindrical sleeve of the associated output shaft. The rotary member 9 concentrically surrounds the output shaft 8 such that the member 9 can relatively rotate with respect to shaft 8. Furthermore, the output shaft 8 and the rotary member 9 are connected such that relative angular displacement between them is prevented at the time of free rotation of the rotary member 9 while relative angular displacement to a predetermined degree is allowed when the rotary member 9 is braked. The rear wheel axle Arl or Arr and the output shaft 8 are so connected that the connection is released in response to relative angular displacement between the output shaft 8 and the rotary member 9.

A plurality of recesses 12, for example, four in number are equally spaced in the circumferential direction on the inner surface of the rotary member 9. Each recess 12 extends over a circumferential angle and is bounded at one end by a first slanted surface 14 and at its other end by a first receiving surface 15. The first slanted surface 14 is positioned at a rear side of the recess 12 relative to the direction of rotation of the rear axle Arl and Arr as shown by arrow 13. This direction of rotation corresponds to forward travel of the vehicle. The surface 14 slants in a forward direction radially outwards relative to the direction of rotation 13. The first receiving surface 15 which is positioned at the forward side of recess 12 extends radially. Arcuate, inner sliding surfaces 16 are formed between adjacent recesses 12.

A plurality, for example, four projections 17 are equally spaced circumferentially on the outer surface of the output shaft 8 and are inserted into the recesses 12 respectively. The shaft 8 is formed with cylindrical outer surfaces 18 between successive projections 17 which are opposite the inner surfaces 16. Each projection 17 is bounded by a second slanted surface 19 and a second receiving surface 20 which are joined by a cylindrical portion. The second slanted surface 19 is formed at the rear side of the projection 17 relative to the direction of rotation 13 and is opposed to the first slanted surface 14. The second receiving surface 20 is formed at the forward side of the projection 17 and opposes the first receiving surface 15. The central angle of the projections 17 is smaller than the central angle of the recesses 12. Openings 21 which are capable of rotatably holding the balls 11 are respectively formed in shaft 8 in each outer surface 18 in the forward side thereof.

A plurality, for example, four receiving recesses 23 are equally spaced in the circumferential direction in the outer surface of the rear wheel axles Arl and Arr. Each recess 23 has slanted side surfaces 22 which widen radially outwards. The receiving recesses 23 may be formed as a tapered hole or groove extending in the axial direction of the wheel axle.

Each of the receiving recesses 23 is formed so that it can rotatably support each of the balls 11. The ball 11 which is supported by each recess 23 projects from the opening 21 so as to slidably contact the inner sliding surface 16 of the rotary member 9.

The springs 10 are respectively interposed in recesses 12 between the first receiving surfaces 15 and the second receiving surfaces 20 thereof. The springs 10 serve as resilient means to apply spring force to separate the first receiving surface 15 and the second receiving surface 20 away from each other.

A disc 24 is concentrically and integrally connected to the rotary member 9 and extends radially thereof. In order to apply brake force to disc 24, and thereby to the rotary member 9, a disc brake 25 is positioned adjacent to disc 24. The disc brake 25 is operated in synchronism with the operation of the brakes Bfl and Brf which are mounted on the front wheels Wfl and Wfr and with the brakes Brl and Brr which are mounted on the rear wheels Wrl and Wrr and with a handbrake (not shown). The disc brake 25 may produce some degree of slidable contact even when it is not operative to halt disc 24 and therefore the springs 10 are sufficiently strong to press the rotary member 9 in opposition to the slidable contact.

The operation of the embodiment will now be described.

The rear wheels axles Arl and Arr rotate in the direction of arrow 13 when the vehicle travels forwardly. Each ball 11 is pressed forwardly and diagonally outwardly by a side surface 22 of the receiving recess 23. The output shaft 8 is rotated angularly in the direction of rotation 13 by balls 11. Since, at this time, the rotary member 9 is assumed to be free of braking force from disc brake 25, rotary member 9 rotates in the direction of arrow 13 through the action of balls 11 and springs 10. The movement of each ball 11 is limited by the associated sliding inner surface 16. The driving force of the rear axles Afl and Arr is transmitted to the output shafts 8 and thereby to the rear wheels Wrl and Wrr.

Figure 4:
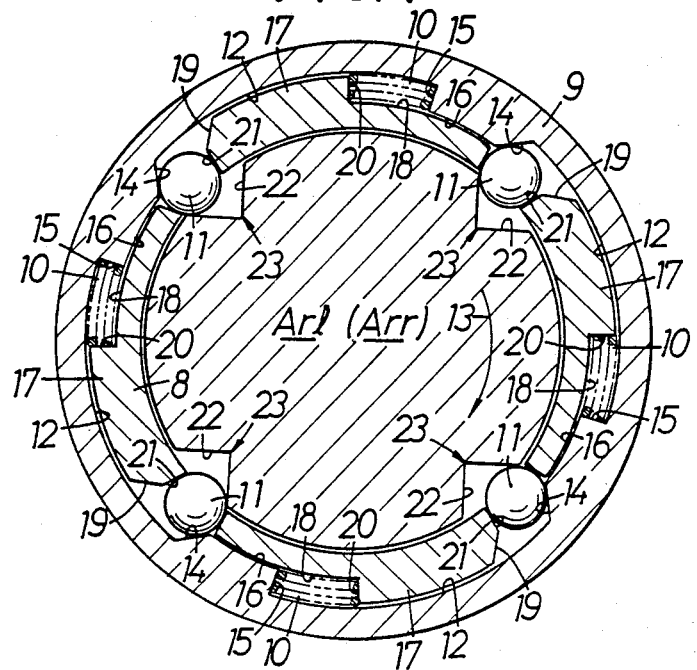
Figure 5:
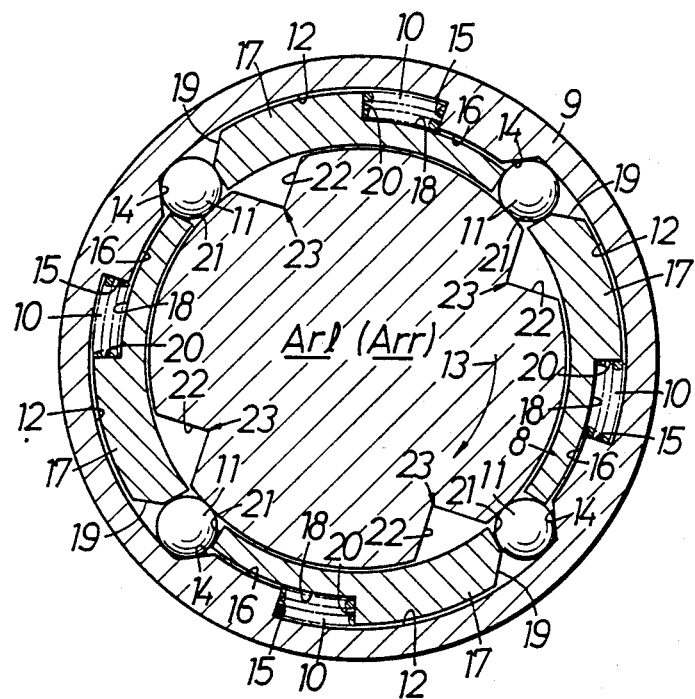

If, in such forward travel state, each of brakes Bfl, Bfr, Brl, Brr is operated, the disc brake 25 is also operated. The disc 24 is braked by brake 25 which causes the rotary member 9 also to be braked. In this case, the output shaft 8, as shown in FIG. 4, compresses the springs 10, and rotates angularly through a small angle in the direction 13 by rotation of the rear wheel axles Arl and Arr in the direction 13. Correspondingly, the balls 11 move forwardly from the position opposite sliding inner surfaces 16 into the recesses 12. The ball 11, as evident in FIG. 5, is pressed by the side surface 22 into the recess 12. In this state, power transmission from the rear wheel axles Arl and Arr to the output shafts 8 is interrupted. The balls 11 which serve as releasing means are now no longer engaged in recesses 23. The effective braking force applied to the rear wheels Wrl and Wrr is only that produced by the brakes Brl and Brr. The braking force of the front wheels Wfl and Wfr is thus preventing from interfering with the rear wheels Wrl and Wrr. As a result of this, the rear wheels Wrl and Wrr are prevented from being overbraked due to any overbraking of the front wheels Wfl and Wrf.

When the brakes Bfl, Bfr, Brl and Brr are released, the disc brake 25 is also released and the rotary member 9 is capable of freely rotating. The rotary member 9 and the output shaft 8 are displaced in reverse direction to separate the first receiving surfaces 15 and the second receiving surfaces 20 by the force of the springs 10. The balls 11 are then pressed by the first slanted surfaces 14 to return into the recesses 23. As a result, power can be transmitted between the rear wheel axles Arl and Arr and the output shafts 8.

The operation described above is also applicable to the case in which the handbrake is operated.

The state in which the vehicle is traveling in reverse will now be described. In this case, the rear wheel axles Arl and Arr rotate in a direction opposite to arrow 13. Since the second slanted surface 19 of the output shaft 8 which is pressed by the ball 11 is this time in contact with the first slanted surface 14, rotation of the output shaft 8 relative to the rotary member 9 is prevented. The ball 11, therefore, is not ejected from the receiving recess 23 into the recess 12. Therefore rotation of the rear wheel axles Arl and Arr will be transmitted to the output shafts 8, that is to the rear wheels Wrl and Wrr. Hence, rotational force which is in the opposite direction to arrow 13 is transmitted to the rear wheels.

The case when engine braking takes place will now be described. Although the output shaft 8 is rotated forwardly with respect to the rear wheel axles Arl and Arr in the direction of the input rotation 13, the relative position between the output shaft 8 and the rotary member 9 is not changed because the rotary member 9 is freely rotatable. The balls 11 are therefore kept in the receiving recesses 23. As a result, power can be transmitted between the output shaft 8 and each of rear wheel axles Arl and Arr.

A free-wheel device is known which automatically switches between the power transmitting state and the power interruption state between the power unit PU and the rear wheels Wrl and Wrr, in response to torque. Such free-wheel device, however, cannot distribute engine braking force to four wheels at the time of engine braking. Only the main drive shaft which is always actuated receives the engine braking force. Furthermore, a device which automatically or manually acts to lock the free-wheel device is needed when the vehicle travels backwards. The power transmitting and interrupting mechanism 7 according to the invention overcomes such disadvantages.

A roller having an axis extending parallel to the rear wheel axles Arl and Arr may be employed as an alternative to the ball 11.

Figure 6:
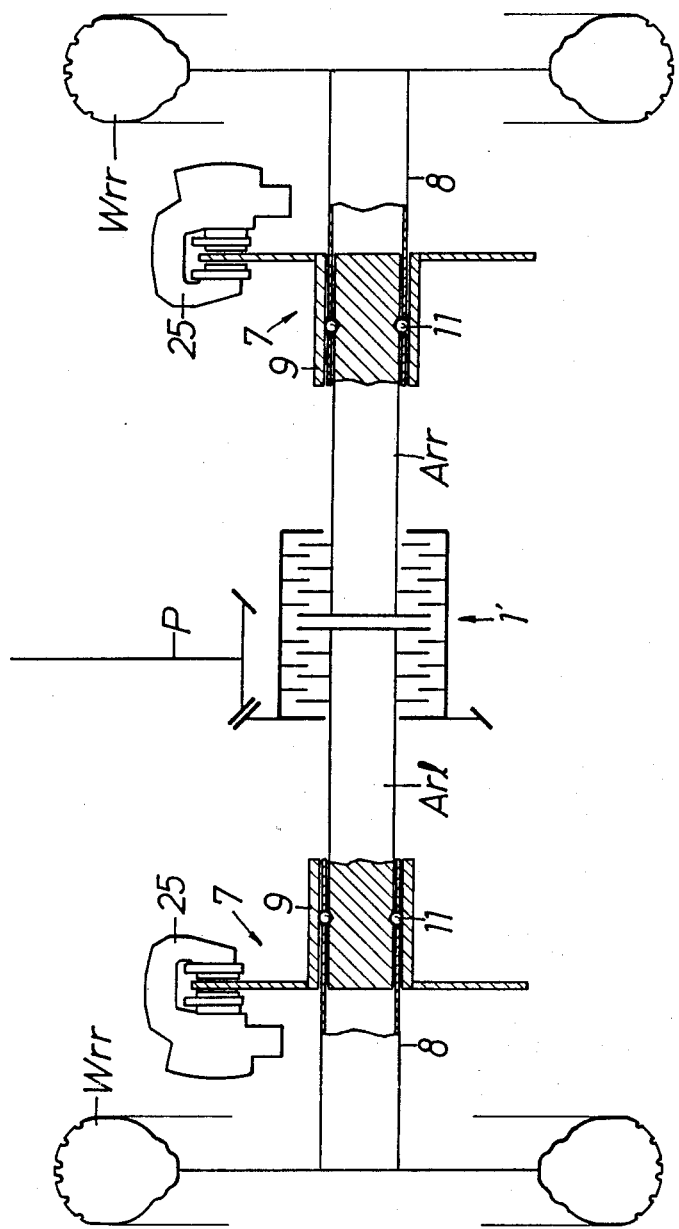
FIGS. 6 and 7 schematically illustrate other embodiments of the present invention.

A further embodiment will now be described with reference to FIG. 6. Therein viscous clutch 1' is arranged between the propeller shaft P which is connected to the power unit PU and the rear wheel axles Arl and Arr.

Figure 7:
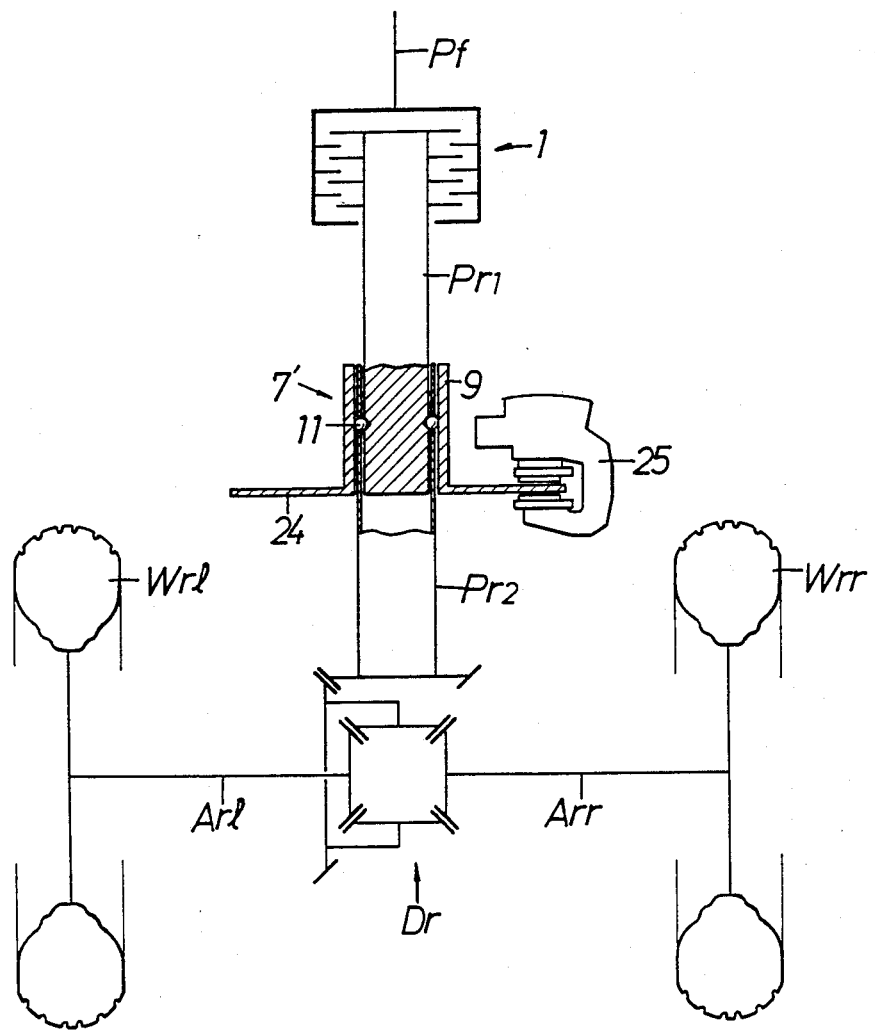

In a further embodiment, a power transmitting and interrupting mechanism 7' may, as shown in FIG. 7, be interposed between a rear propeller shaft $Pr_1$ as an input shaft which is connected to the viscous clutch 1 and a rear propeller shaft $Pr_2$ as an output shaft which is connected to the rear differential device Dr.

According to the present invention, the size of the input and output shafts in the radial direction can be made small, as a result of which, a compact and simple structure can be realized. Furthermore, the output shaft can be braked, which will be effectively utilized for selective power transmitting and interruption for a driving system for a four-wheel drive vehicle. This gives the following advantages:

the mechanism comprising the rotary body equipped with the brake mechanism, the input shaft and the output shaft are rotatably arranged along one axis;

the output shaft and the rotary member are so connected that relative angular displacement is prevented at the time of free rotation of the rotary member;

relative angular displacement in a predetermined range of the output shaft with respect to the rotating member is permitted at the time of braking the rotary member; and the input shaft and the output shaft are connected so as to be released in accordance with relative angular displacement between the output shaft and the rotary member.

Although the above invention has been described in relation to specific embodiments thereof, it will become apparent to those skilled in the art that numerous modifications and variations can be made within the scope and spirit of the invention as defined in the attached claims.

What is claimed is:

1. A mechanism for selectively transmitting and interrupting power between an input shaft and an output shaft arranged in coaxial relation, said mechanism comprising
   a rotary member,
   means coupling said rotary member with one of said shafts for providing first and second state therebetween in which in said first state the rotary member is free to rotate and said means provides transmission of rotation between the input and output shafts, whereas in said second state said one shaft can rotate relative to the other said shaft and transmission of rotation is interrupted, said rotary member and said other shaft being angularly rotated relative to one another between first and second relative positions in said second state, and
   said coupling means including a ball releasably interposed between said shafts and a spring between said rotary member and said other shaft to permit the relative angular rotation between the rotary member and the other shaft,
   said ball in said first state being engaged with said shafts and said spring being relaxed whereas in said second state said ball is released from said one shaft and said spring is under stress,
   said one shaft having a recess receiving said ball, said other shaft having a further recess and a projection adjacent to said further recess, said rotary member including a further projection engaged in said further recess in said other shaft, said spring being engaged in said further recess in said other shaft and bearing against said further projection on said rotary member.

2. A mechanism as claimed in claim 1 wherein said recess in said one shaft is symmetrical and V-shaped.

3. A mechanism as claimed in claim 1 wherein in said first state said ball is engaged in the recess in said one shaft and bears against an inner wall of said rotary member for relative slidable movement.

4. A mechanism as claimed in claim 3 wherein in said second state said ball is ejected from said recess in said one shaft and is retained in said further recess in said other shaft outside said one shaft.

5. A mechanism as claimed in claim 4 wherein said other shaft has a hole in which said ball is seated for relative radial movement therein.

6. A mechanism as claimed in claim 5 wherein said projection and said further projection have inclined surfaces facing each other which are spaced apart angularly in said second state to receive said ball therebetween.

7. A mechanism as claimed in claim 1 wherein said rotary member coaxially surrounds said other shaft, said other shaft being hollow and said one shaft being coaxially inserted in said other shaft, said rotary member including a radial projection, and braking means comprising a disc brake engageable with said radial projection.

8. A mechanism as claimed in claim 1 for use in a vehicle having four wheel drive and including a power unit for driving the front and rear wheels of the vehicle, said mechanism being interposed between the power unit and the rear wheels.

9. A mechanism as claimed in claim 1 comprising braking means for applying braking force to halt rotation of said rotary member in said second state, said rotary member than applying braking force to said other shaft.

10. A mechanism as claimed is claim 1, 2, 3, 4, 5, 6, 7, 8 or 9 wherein said ball, said spring, said recess for receiving the balls, said projection, said further recess and said further projection are each provided in plural number respectively in angularly spaced relation from one another.

11. A mechanism as claimed in claim 1, 2, 3, 4, 5, 6, 7, 8 or 9 wherein said one shaft is the input shaft.

* * * * *